J. W. HURLEY.
BEER COOLER.
APPLICATION FILED JULY 5, 1912.
1,046,298.
Patented Dec. 3, 1912.
4 SHEETS—SHEET 1.
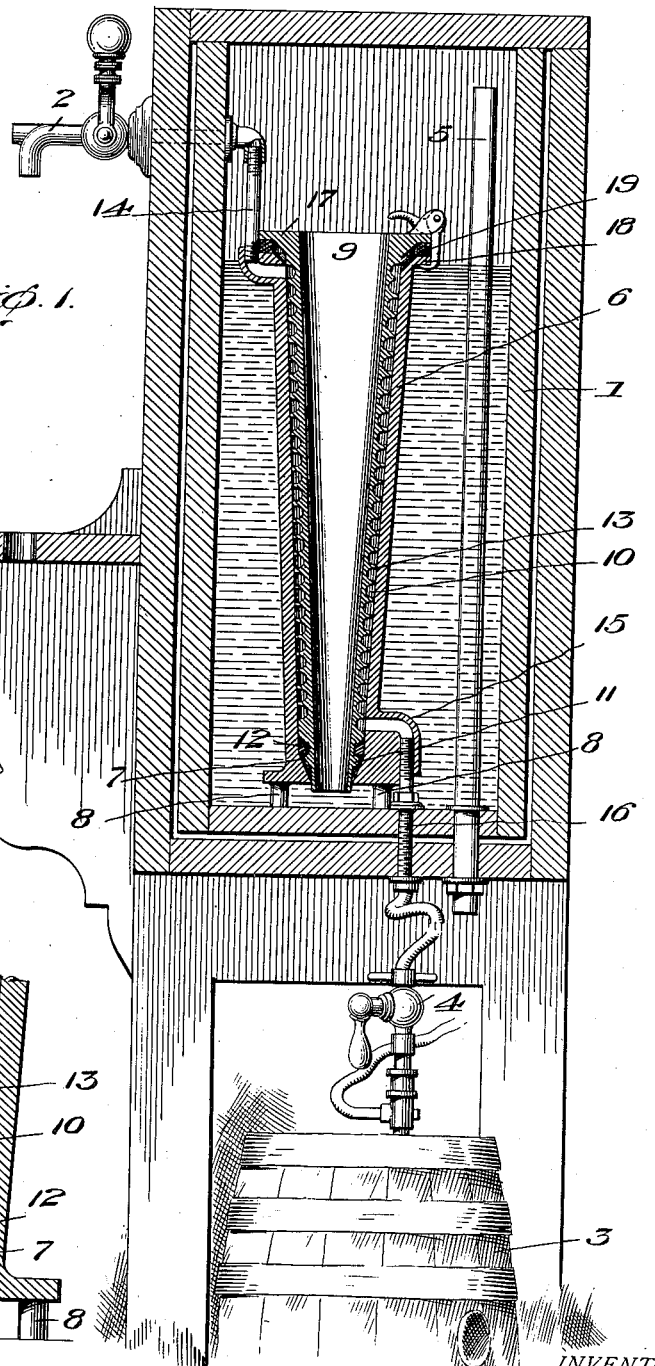

J. W. HURLEY.
BEER COOLER.
APPLICATION FILED JULY 5, 1912.
1,046,298.
Patented Dec. 3, 1912.
4 SHEETS—SHEET 2.
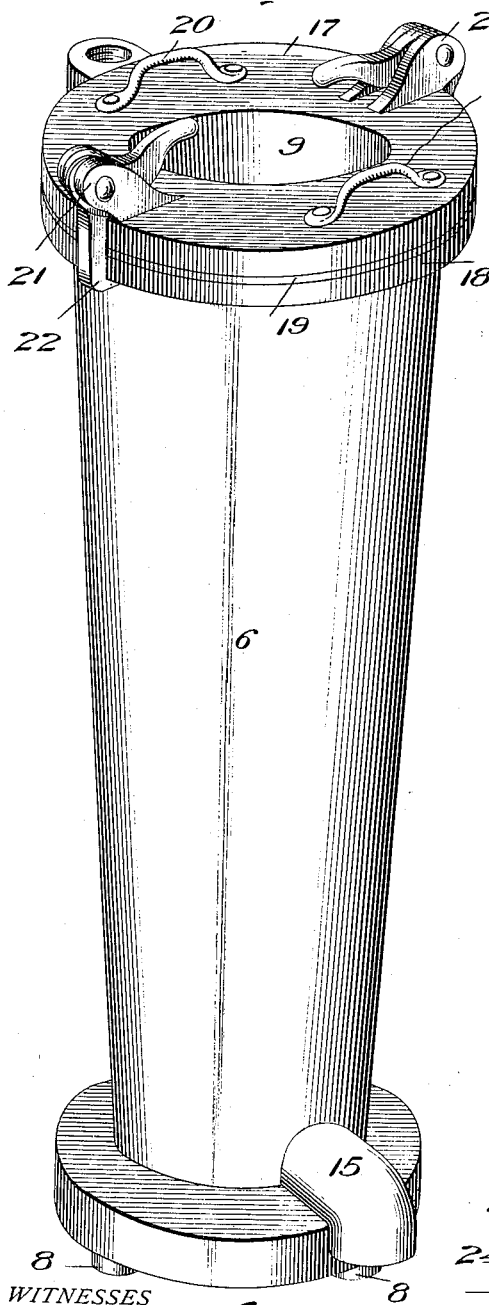
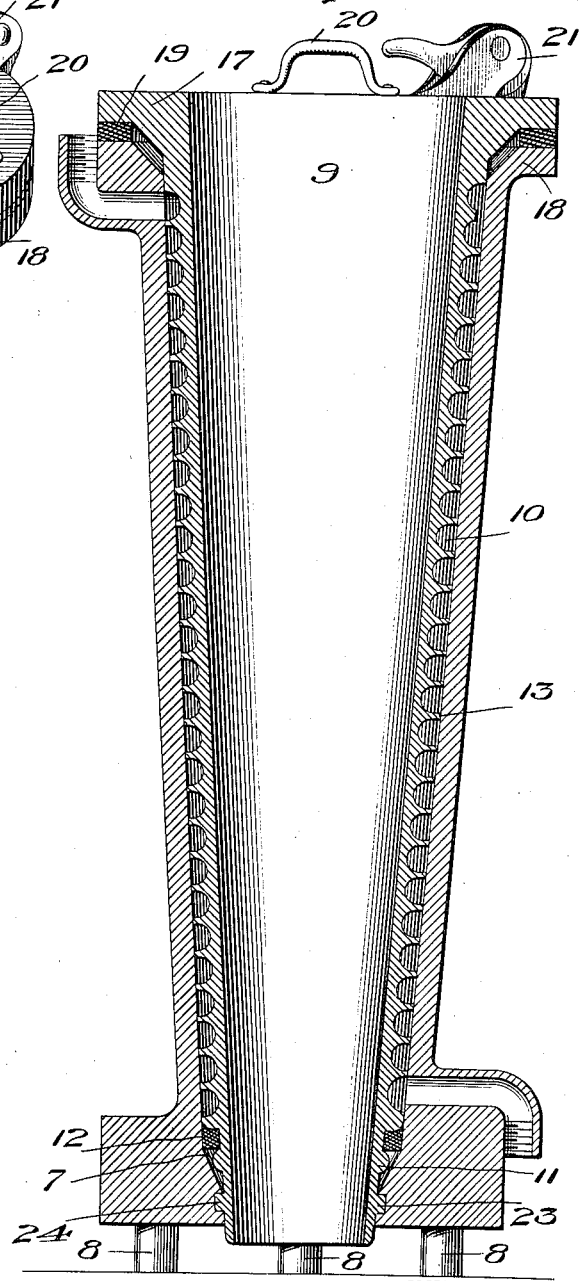

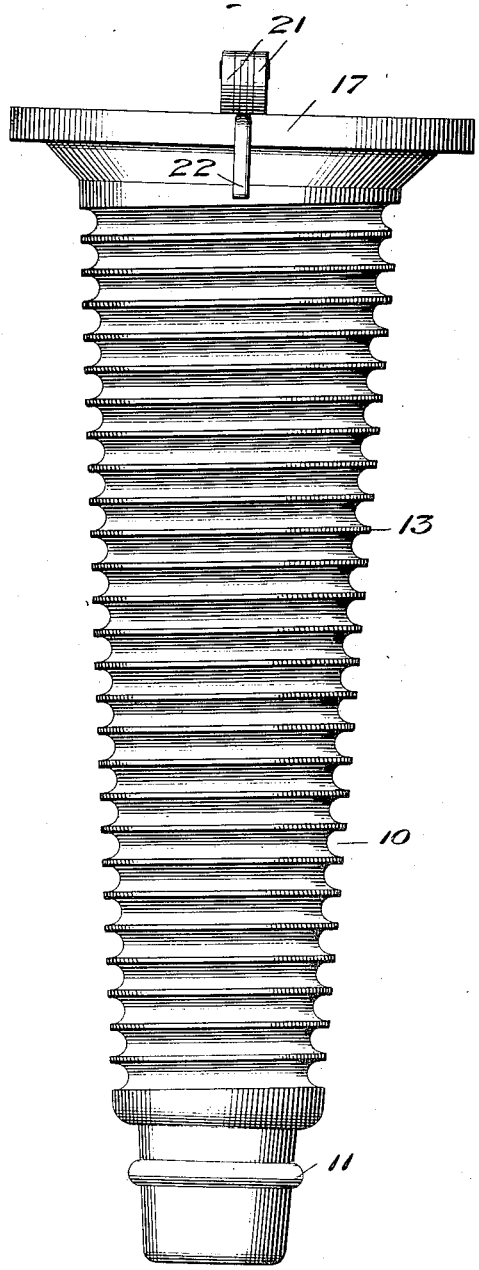
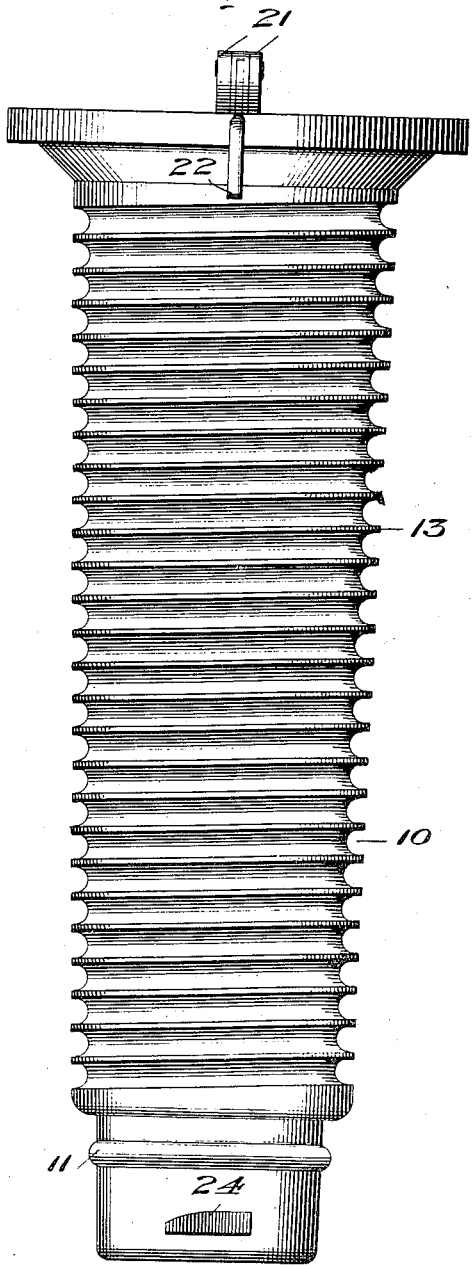

J. W. HURLEY.
BEER COOLER.
APPLICATION FILED JULY 5, 1912.
1,046,298.
Patented Dec. 3, 1912.
4 SHEETS—SHEET 4.
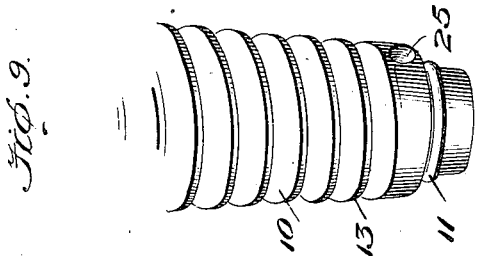
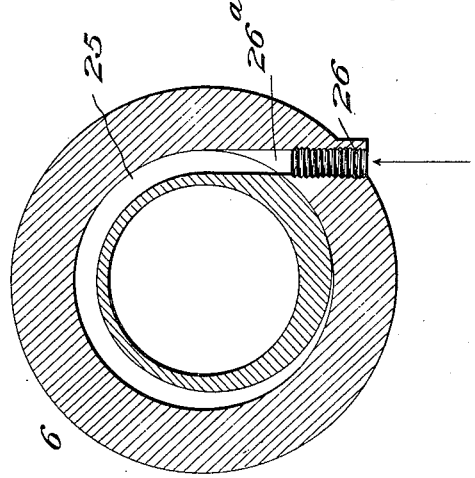
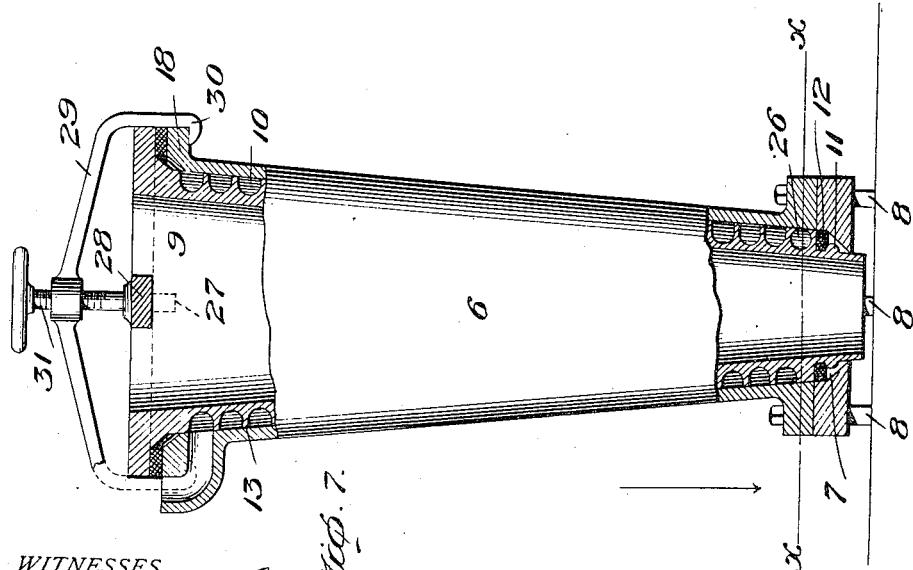
WITNESSES
INVENTOR
John W. Hurley
Attorney

UNITED STATES PATENT OFFICE.

JOHN W. HURLEY, OF WASHINGTON, DISTRICT OF COLUMBIA.

BEER-COOLER.

1,046,298.  Specification of Letters Patent.  Patented Dec. 3, 1912.

Application filed July 5, 1912. Serial No. 707,953.

*To all whom it may concern:*

Be it known that I, JOHN W. HURLEY, a citizen of the United States, residing at Washington, District of Columbia, have invented certain new and useful Improvements in Beer-Coolers, of which the following is a specification.

This invention relates to beer coolers.

The ordinary beer cooler coil which is usually made of block tin is subject to numerous objections, among which may be mentioned its short life, difficulty in cleaning, tendency to accumulate impurities which contaminate the beer passing therethrough, difficulty in detaching and removing it from its place in the cooler box, and its pitting and disintegration by the ammonia in the ice water. Among its other defects is its relatively great expense and necessity for comparatively frequent renewal, aside from being insanitary.

My invention has for its object the provision of a beer cooler of simple, strong and durable construction which may be inexpensively manufactured and installed, either originally when the beer dispensing apparatus is put in, or subsequently to supplant the old type of continuous pipe coil cooler.

A further object is to provide an improved beer cooler which can be readily taken apart and quickly washed and cleaned, will not be liable to injury, as is the case with cooler coils, will not be subject to disintegration by the action of ammonia, will at all times afford a free and easy circulation for the beer and the ready disposal of the ice about the beer cooler and the flow or circulation of the ice water therethrough.

Further objects are to provide an improved beer cooler made of separable parts of new construction having new means for the connection together thereof which permits rapid and easy assembling or separation and prevents any leakage of the beer.

A still further object is to provide a beer cooler of novel construction having the inlet thereof arranged in relation to the cooling coils or channels so that there is no interference with the free admission of the beer under the usual pressure and hence no gurgling or choking or back pressure which would interfere with the drawing off of the beer.

Having in view the foregoing objects and others which will more fully appear from the following description, the invention consists, first, in a beer cooler composed of inner and outer shells one of which has spiral grooves constituting coils or channels for the passage of the beer, the inner shell being tightly fitted into the outer shell and inlet and outlet means being provided for the admission and outflow of the beer; second, in a beer cooler of the class set forth having the inner shell exteriorly tapered and the outer shell interiorly tapered, the inner shell being provided with spiral exterior grooves constituting a beer circulating coil or channel when the shells are fitted together, together with an inlet and an outlet for admitting the beer to the spiral channel and taking it off therefrom, the inner shell being hollow and both shells arranged so that the ice and ice water may circulate through the inner shell, whereby the beer is subject to cooling action at all points; third, by providing, in a beer cooler, new means for the admission of the beer to the cooling or circulating channel of the cooler in such manner that no back pressure will occur to interfere with the free entry of the beer into the cooler; fourth, in the provision of a beer cooler composed of inner and outer separable shells combined with new means for drawing the shells tightly together without interfering with adaptability for ready separation for purposes of cleaning when desired; fifth, in the provision of a beer cooler of novel construction having an inner removable shell provided with beer circulating channels and an exterior shell adapted for connection to the beer supplying and beer dispensing means, which may be readily installed in any beer dispensing apparatus in use in substitution for the ordinary cooling coil, and, further, in the provision of an improved cooler having its parts so arranged that they may be taken apart and cleaned without interfering with the practically continuous use of the cooler or the dispensing of the beer.

The invention is susceptible of various modifications and forms, certain ones of which are set forth fully hereinafter and are shown in the accompanying drawings, in which—

Figure 1 is a vertical section showing the invention in use; Fig. 2, a detail vertical section of the lower end of the cooler; Fig. 3, an exterior perspective of another form; Fig. 4, a vertical section through the cooler of Fig. 3; Fig. 5, an exterior view of the inner shell of Figs. 1 and 2, the gasket being removed; Fig. 6, a similar view of the inner shell of the form shown in Figs. 3 and 4, the gasket being removed; Fig. 7, an elevation, partly in section, showing another form of the invention; Fig. 8, a detail view on line x—x, Fig. 7; and Fig. 9, a detail perspective of the lower part of the inner shell of the form shown in Fig. 7.

The ice box of an ordinary beer dispensing apparatus is shown at 1, the dispensing faucet or spigot at 2, the keg or cask at 3 and the drawing off or beer pipe at 4, which is valved, as usual, so that the supply of beer to the cooling apparatus may be cut off, as for instance, when the cooler is being cleaned. The usual overflow pipe appears at 5.

Referring first to Figs. 1 and 2, 6 designates an outer metallic shell which may be of any preferred metal not susceptible to ammonia or other acid to which it would be subject, the interior of the shell being tapered from its upper to its lower end, its lower end being more abruptly tapered, as shown in Fig. 2, at 7. The base of the outer shell is provided with supporting legs 8, whereby the cooler is raised above the bottom of the ice box to permit the free circulation of the ice water through the cooler. Fitted into the interior of the shell 6 is an inner removable shell 9 whose exterior, and preferably whose interior, is tapered from its upper to its lower end. The outer surface of the inner shell 9 is provided with a spiral continuous groove or channel of the form shown in Fig. 5 at 10. Both the inner and the outer shell are of solid metal and are preferably, though not necessarily, constructed of "Thompson" metal. The lower end of the inner shell 9 is adapted to fit within the tapered or concaved part 7 and has an annular bead or flange 11. Surrounding the inner shell and located between the bead 11 and the lower end of the spiral channel 10 is a gasket 12 of any preferred or ordinary form which snugly fits against the interior of the outer shell and, due to the forcing of the inner shell into the outer shell, this gasket is compressed and affords a liquid-tight joint between the shells at their lower parts. The dimensions and taper of the shells are such that the inner shell wedges tightly into the outer shell so that each and every crest 13 of the spiral channel 10 fits snugly against the interior of the outer shell and there is no possibility of the beer escaping from one part of the channel 10 to another part thereof, but it is forced to circulate around the inner shell and between it and the outer shell before it can finally pass out through the pipe 14 which delivers it to the spigot or faucet 2. The lower part of the outer shell is provided with an internally screw-threaded pipe coupling 15 for the connection of the pipe 16 which admits the beer to the cooler.

The upper end of the inner shell 9 is enlarged to form a flanged head 17 and interposed between this head and the flanged head 18 on the outer shell is a compressible gasket 19 of any preferred or ordinary construction. I provide on the head 17 handles 20 which enable the bar tender or other attendant to obtain a free grasp on the inner shell and permits the easy lifting of the inner shell out of the outer shell. To clamp the inner and outer shells firmly together and to compress the gaskets 12 and 19, I provide cam clamps which are pivoted to ears 21 on the head 17 and whose hooked parts 22 are adapted to engage under the flange 18. These clamps may be two or more in number and afford a means for quickly and easily clamping the inner and outer shells together with such pressure that the inner shell is firmly wedged into the outer shell and the gaskets are compressed and prevent any leakage.

In the form shown in Figs. 3, 4 and 6, the base of the outer shell is provided with inclined or wedge grooves 23 and the inner shell has inclined or wedge lugs 24 adapted to be engaged with said grooves, the arrangement being such that the inner shell may be inserted into the outer shell and given a twist to cause the lugs 24 to enter the grooves 23, thereby clamping the inner and outer shells together at their lower ends and drawing the inner shell down into the outer shell, such clamping action supplementing that afforded by the parts 21, 22. To remove the inner shell, it is only necessary, in this form of the invention, to first release the clamps 21, 22 and then to grasp the handles 20 and impart a twist to the inner shell, whereupon the inner shell may be readily removed.

In the form shown in Figs. 7, 8 and 9, the lower part of the cooler is of the construction shown in Figs. 1 and 2, except that the lowermost part 25 of the spiral beer circulating channel 10 is arranged tangentially and the coupling 26 for the pipe 16 may be also arranged tangentially, as shown in Fig. 8, or it may be arranged vertically, but in either instance, the delivery of the beer is in a tangential direction into the lowest groove of the channel 10. This arrangement prevents any back pressure on the beer or interference with its free entry into the channel 10. In consequence, the beer cannot choke as it enters the cooler and its untrammeled circulation in the channel 10 and exit into the pipe 17 is assured. To insure the absolute alinement of the part 25 with the coupling 26, or at least the part 26ª which delivers the beer into the channel 10, I provide on the inner shell 9 a lug 27 adapted to fit in a corresponding notch in the inner upper edge of the outer shell. By dropping the lug in this notch, the parts 25 and 26ª are assured of alinement. To insure a firm clamping of the inner and outer shells together and the wedging of the inner shell in the outer shell, as well as the compression of the gasket, I provide in this form of the invention a bridge 28 extending across the inner shell and preferably integral therewith and a detachable yoke 29 whose hooked ends 30 engage under the flanged head 18, as also a hand screw 31 threaded through the yoke and having its tip adapted to bear on the cross piece 28. On releasing the screw 31, the yoke 29 may be removed by tilting and the inner shell may be taken out. The handles 20 may be provided on the inner shell, as previously.

In all forms of the invention, when it is desired to clean the cooler, the valve in the pipe 4 is turned to cut off the supply of beer and the shells are unclamped from each other and the inner shell removed. The spiral beer circulating channel 10 may then be readily cleaned and the smooth interior of the outer shell washed, after which the inner shell may be quickly reinserted within and clamped to the outer shell so that there is practically no interference with the dispensing of the beer from the spigot 2.

My invention is not only adapted to be installed originally in a beer dispensing apparatus, but it may be quickly and easily substituted for the old style type of continuous pipe coil at small expense and with little labor.

I am aware that various modifications might be resorted to in carrying out my invention and I, therefore, lay claim to all forms falling within the spirit and scope of the invention.

Having thus described my invention, what I claim as new and desire to secure by Letters Patent, is:—

1. In a beer cooler, the combination of an outer shell having a tapered interior, a removable inner shell having a tapered exterior provided with a liquid circulating channel, said inner shell being adapted to fit the interior of the outer shell and having a shoulder or bead on its smaller end, means for securing the shells together, one within the other, means for admitting liquid to the channel, means for taking the liquid off from said channel, a compressible gasket interposed between the two shells at the larger end of the cooler, and a compressible gasket surrounding and carried by the smaller end of the inner shell and held by the bead thereof, said last named gasket bearing against the interior of the outer shell.

2. In a beer cooler, the combination of an outer shell having a tapered interior terminating in a more abruptly tapered interior at its end part, a removable inner shell having a tapered exterior provided with a liquid circulating channel, said inner shell being adapted to fit the interior of the outer shell and having a shoulder or bead on its smaller end, means for securing the shells together, one within the other, the smaller end of the inner shell being received in the abruptly tapered interior part of the outer shell, means for admitting liquid to the channel, means for taking the liquid off from said channel, a compressible gasket interposed between the two shells at the larger end of the cooler, and a compressible gasket surrounding and carried by the smaller end of the inner shell and held by the bead thereof, said last named gasket bearing against the abruptly tapered interior part of the outer shell.

3. In a beer cooler, the combination of an outer shell, an inner shell fitted into the outer shell, the inner shell having an exterior liquid circulating channel disposed between the two shells, liquid admission means for said channel, a lug on one of the shells, the other shell being provided with means adapted to engage the lug when the shells are fitted together, said devices being arranged to insure that the liquid admission means will be in position to deliver the liquid to the channel, means for taking off the liquid from the channel, and means for securing the shells one within the other.

In testimony whereof, I hereunto affix my signature in presence of two witnesses.

JOHN W. HURLEY.

Witnesses:
HARRY C. COLUMBUS,
GEO. D. HEMING.